(12) United States Patent
Shah et al.

(10) Patent No.: US 8,099,627 B1
(45) Date of Patent: Jan. 17, 2012

(54) PERSISTENT IMAGES OF DISTRIBUTED SHARED MEMORY SEGMENTS AND IN-MEMORY CHECKPOINTS

(75) Inventors: Veeral P. Shah, Mumbai (IN); Milind Vithal Borate, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1433 days.

(21) Appl. No.: 11/167,962

(22) Filed: Jun. 28, 2005

(51) Int. Cl.
*G06F 11/00* (2006.01)

(52) U.S. Cl. .......................................... 714/16
(58) Field of Classification Search .................. 714/16
See application file for complete search history.

(56) References Cited

U.S. PATENT DOCUMENTS

| | | | | |
|---|---|---|---|---|
| 5,737,514 A | * | 4/1998 | Stiffler | 714/13 |
| 5,916,307 A | * | 6/1999 | Piskiel et al. | 719/314 |
| 5,951,695 A | * | 9/1999 | Kolovson | 714/16 |
| 5,996,088 A | * | 11/1999 | Frank et al. | 714/6 |
| 6,014,669 A | * | 1/2000 | Slaughter et al. | 707/10 |
| 6,691,245 B1 | * | 2/2004 | DeKoning | 714/6 |
| 6,823,474 B2 | * | 11/2004 | Kampe et al. | 714/13 |
| 6,892,320 B1 | * | 5/2005 | Roush | 714/15 |
| 7,394,832 B1 | * | 7/2008 | Dykstra | 370/509 |
| 7,568,089 B1 | * | 7/2009 | Favor et al. | 712/228 |
| 7,779,295 B1 | * | 8/2010 | Shah et al. | 714/6.32 |
| 2002/0032883 A1 | * | 3/2002 | Kampe et al. | 714/16 |

* cited by examiner

*Primary Examiner* — Amine Riad
(74) *Attorney, Agent, or Firm* — Campbell Stephenson LLP

(57) ABSTRACT

A method, system, computer system, and computer-readable medium that enable quick recovery from failure of one or more nodes, applications, and/or communication links in a distributed computing environment, such as a cluster. Recovery is facilitated by regularly saving persistent images of the in-memory checkpoint data and/or of distributed shared memory segments. The persistent checkpoint images are written asynchronously so that applications can continue to write data even during creation and/or updating the persistent image and with minimal effect on application performance. Furthermore, multiple updater nodes can simultaneously update the persistent checkpoint image using normal synchronization operations. When one or more nodes fail, the persistent checkpoint image can be read and used to restart the application in the most recently-saved state prior to the failure. The persistent checkpoint image can also be used to initialize the state of the application in a new node joining the distributed computing environment.

16 Claims, 5 Drawing Sheets

Operation of Persistent Image Update Module

PERSISTENT IMAGES OF DISTRIBUTED SHARED MEMORY SEGMENTS AND IN-MEMORY CHECKPOINTS

BACKGROUND OF THE INVENTION

Networked computer systems enable users to share resources and services. One computer can request and use resources or services provided by another computer. The computer requesting and using the resources or services provided by another computer is typically known as a client, and the computer providing resources or services to another computer is known as a server.

A group of independent network servers may be used to form a cluster. Servers in a cluster are organized so that they operate and appear to clients as if they were a single unit. A cluster and its network may be designed to improve network capacity by, among other things, enabling the servers within a cluster to shift work in order to balance the load. By enabling one server to take over for another, a cluster may be used to enhance stability and minimize downtime caused by an application or system failure.

Today, networked computer systems including clusters are used in many different aspects of our daily lives. They are used, for example, in business, government, education, entertainment, and communication. As networked computer systems and clusters become more prevalent and our reliance on them increases, it has become increasingly more important to achieve the goal of continuous availability of these "high-availability" systems.

High-availability systems need to detect and recover from a failure in a way transparent to its users. For example, if a server in a high-availability system fails, the system should detect and recover from the failure with no or little impact on clients.

Various methods have been devised to achieve high availability in networked computer systems including clusters. For example, one method known as triple module redundancy, or "TMR," is used to increase fault tolerance at the hardware level. Specifically, with TMR, three instances of the same hardware module concurrently execute and, by comparing the results of the three hardware modules and using the majority results, one can detect a failure of any of the hardware modules. However, TMR does not detect and recover from a failure of software modules. Another method for achieving high availability is software replication, in which a software module that provides a service to a client is replicated on at least two different nodes in the system. While software replication overcomes some disadvantages of TMR, software replication suffers from its own problems, including the need for complex software protocols to ensure that all of the replicas have the same state.

Replication of hardware or software modules to achieve high-availability raises a number of new problems including management of replicated hardware and software modules. The management of replicas has become increasingly difficult and complex, especially if replication is done at the individual software and hardware level. Further, replication places a significant burden on system resources.

When replication is used to achieve high availability, one needs to manage redundant components and have an ability to assign work from failing components to healthy ones. However, telling a primary component to restart or a secondary component to take over is not sufficient to ensure continuity of services. To achieve a seamless fail-over, the successor needs to resume operations where the failing component stopped functioning. As a result, secondary components need to know the last stable state of the primary component.

What is needed is a way to quickly recover from failure of one or more nodes, applications, and/or communication links in a distributed computing environment, such as a cluster. Preferably, an application that was running on the failed node can be restarted in the state that the application had before the node failed. These capabilities should have little or no effect on performance of applications.

SUMMARY OF THE INVENTION

The present invention enables quick recovery from failure of one or more nodes, applications, and/or communication links in a distributed computing environment, such as a cluster. An application that was running at the time of failure can be restarted in the state that the application had before the failure. Recovery is facilitated by ensuring that multiple nodes in the distributed environment or cluster are periodically synchronized to have consistent in-memory checkpoint images and/or distributed memory segments. Maintaining consistent checkpoint images across all nodes in the cluster enables the in-memory checkpoint image from other nodes to be used to recover the application on a failed node.

Recovery is also facilitated by regularly saving persistent images of the in-memory checkpoint data and/or of distributed shared memory segments. The persistent images are written asynchronously so that applications can continue to write data even during creation and/or updating the persistent image and with minimal effect on application performance. Furthermore, multiple updater nodes can simultaneously update the persistent checkpoint image using synchronization operations. When one or more nodes fail, the persistent checkpoint image can be read and used to restart the application in the most recently-saved state prior to the failure. The persistent checkpoint image can also be used to initialize the state of the application in a new node joining the distributed computing environment.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

Figure 1:
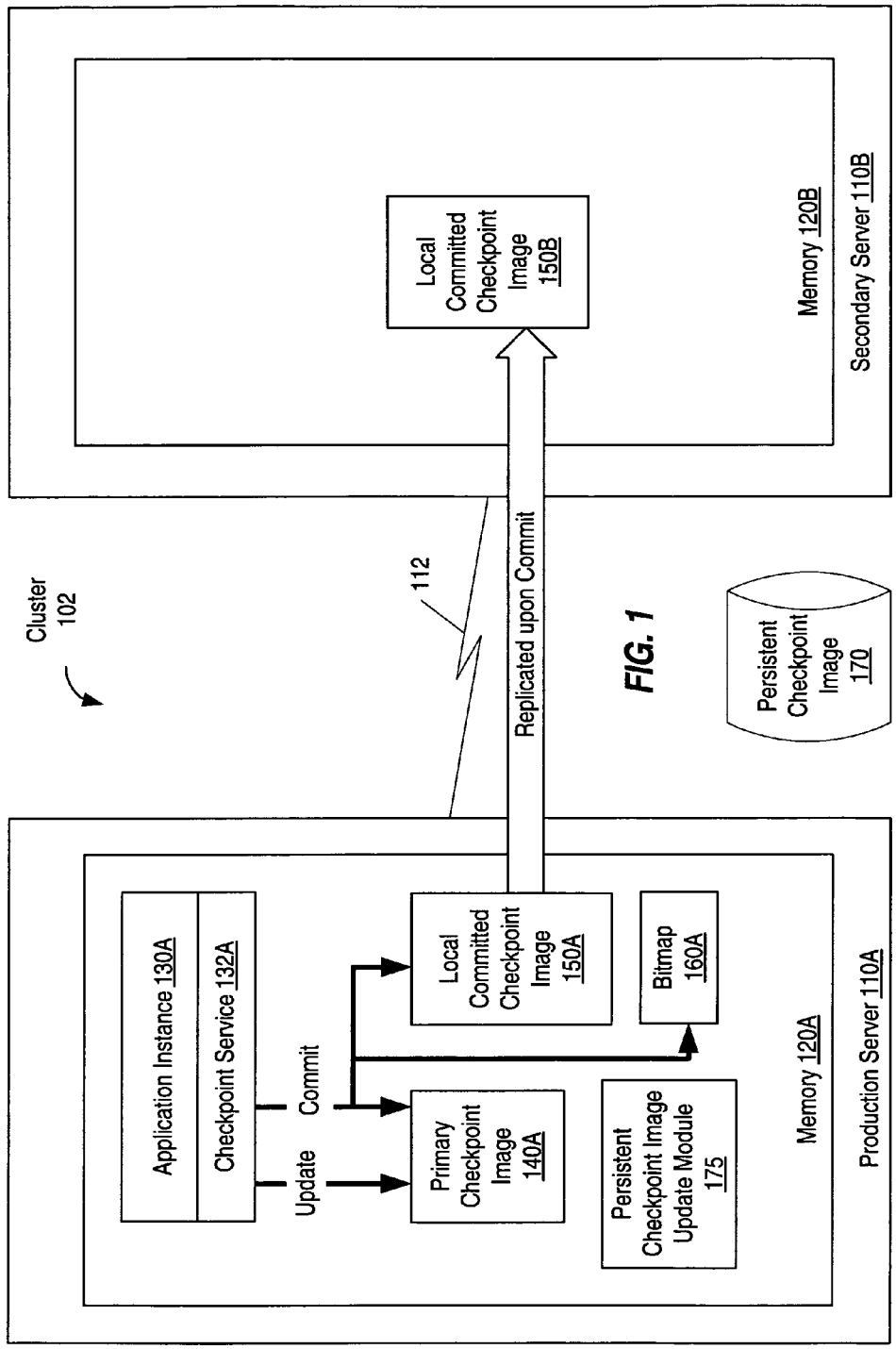
FIG. 1 is a diagram of an environment in which the present invention may be used.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention enables quick recovery from failure of one or more nodes, applications, and/or communication links in a distributed computing environment, such as a cluster. An application that was running at the time of failure can be restarted in the state that the application had before the failure. Recovery is facilitated by ensuring that multiple nodes in the distributed environment or cluster are periodically synchronized to have consistent in-memory checkpoint images and/or distributed memory segments. Maintaining consistent checkpoint images across all nodes in the cluster enables the in-memory checkpoint image from other nodes to be used to recover the application on a failed node.

Recovery is also facilitated by regularly saving persistent images of the in-memory checkpoint data and/or of distributed shared memory segments. The persistent images are written asynchronously so that applications can continue to write data even during creation and/or updating the persistent image and with minimal effect on application performance. Furthermore, multiple updater nodes can simultaneously update the persistent checkpoint image using synchronization operations. When an entire cluster fails, the persistent checkpoint image can be read and used to restart the application in the most recently-saved state prior to the failure. The persistent checkpoint image can also be used to initialize the state of the application in a new node joining the distributed computing environment.

FIG. 1 is a diagram of an example environment in which the present invention may be used. In this example environment, a cluster 102 is made up of two nodes, production server 110A and secondary server 110B. Servers in cluster 102 are connected via a cluster communication channel 112, and may be connected to client computer systems (not shown) via other network communication link(s) (not shown). Each of servers 110A and 110B may be implemented as a standard computer system, having a processor (not shown) to execute computer instructions, an operating system (not shown), a memory to store the computer instructions, shown here as memory 120A and 120B, and other components as are known in the art. Production server 110A is shown as executing application instance 130A. Secondary server 110B is not executing an instance of the application, but is assumed to be capable of executing such an application instance if production server 110A should fail.

To facilitate recovery in the event of failure, a checkpoint service 132A is used by application instance 130A to save the state of the application. In the example shown, checkpoint data are saved in memory 120A as primary checkpoint image 140A. Checkpoint service 132A provides application program interfaces (APIs) and infrastructure for application instances to record the state of the application at given points in time.

The state of the application includes data being used by application instance 130A executing on production server 110A and other information relevant to the server state (values of in-memory variables, etc.). The state of the application instance is referred to herein as a checkpoint. A checkpoint can be made up of consecutive or non-consecutive system memory pages. A checkpoint can be saved in a distributed shared memory (DSM) segment, where each node sharing the checkpoint has a complete copy of the distributed shared memory segment. In an implementation using DSM segments, a checkpoint service such as checkpoint service 132 replicates DSM segments on multiple backup nodes for fault tolerance reasons. The terms 'checkpoint' and 'checkpoint image' are used herein to refer to both in-memory checkpoints and distributed shared memory (DSM) segments, and the scope of the invention includes both techniques of saving the state of the application, as well as other comparable techniques. The term 'writer node' is used to describe a node in a cluster or network that updates the state of the application by, for example, executing an application instance that writes data or in-memory variables.

Checkpoint service 132A ensures that replicas of the checkpoint data on other nodes in cluster 102 are consistent with the state of application instance 130A recorded on production server 110A. If production server 110A should fail, a replica of the checkpoint data can be retrieved from another node in the cluster (in this case secondary node 110B). Another application instance can be started on secondary server 110B, resuming execution from the state that was recorded in the replica checkpoint data on secondary node 110B.

In the example of FIG. 1, updates to the state of the application by application instance 130A are made directly to the in-memory primary checkpoint image 140A. In one embodiment, an application instance performs a "memory mapping" of a buffer in application process address space to a checkpoint image in kernel memory. Memory mapping enables a write to the application buffer to be made directly made to a checkpoint image in system memory, such as to primary checkpoint image 140A. An application buffer can also be memory-mapped to a DSM segment. Memory mapping enables overhead to be minimized in accessing and updating checkpoint images.

Periodically, application instance 130A commits updates, and copies of local committed checkpoint images in cluster 102 are updated, including local committed checkpoint images 150A and 150B. For an application instance on one node to have access to an update made on another node, the node performing the update commits the update. Committed checkpoint images, such as local committed checkpoint images 150A and 150B, include only those updates that have been committed.

The committed checkpoint image is saved as a persistent checkpoint image periodically, shown in FIG. 1 as persistent checkpoint image 170. In this example, persistent checkpoint image 170 is maintained by a persistent checkpoint image module 175 in memory 120A of production server 110A. Persistent checkpoint image 170 is preferably updated asynchronously, so that the performance of applications updating the in-memory checkpoint images is not slowed by write operations to disk. As a result, persistent checkpoint image 170 may lag behind the in-memory checkpoint images, such as primary checkpoint image 140A and local committed checkpoint images 150A and 150B. A node in a cluster or network that is responsible for creating and updating the persistent image is referred to herein as an 'updater node.' In this example, production server 110A operates as an updater node and executes a persistent checkpoint image update module 175. One of skill in the art will recognize that the functionality of persistent checkpoint image update module 175 may be implemented in various ways, such as part of checkpoint service 132A, as a module or instructions running on a separate updater node, or as software or firmware of a storage appliance.

Bitmap 160A is a bitmap with one bit for each portion of memory in committed checkpoint image 150A. The term 'portion of memory' is used to describe a unit of memory, such as a block or a region; different implementations may use portions of different sizes. Bitmap 160A is used to enhance performance of maintaining of a persistent checkpoint image by indicating portions of committed checkpoint image 150A that have changed (i.e., been updated or newly-written) since the most recent update of persistent checkpoint image 170. For example, a value of '1' may be used to indicate that the corresponding portion of committed checkpoint image 150A has changed since persistent checkpoint image 170 was updated. A value of '0' may be used to indicate that the corresponding portion of committed checkpoint image 150A has not changed since persistent checkpoint image 170 was updated. The appropriate bit(s) of bitmap 160A are set with every commit operation.

Bitmap 160A therefore enables the updated portions of local committed checkpoint images to be used to update persistent checkpoint image 170 without copying the entire local committed checkpoint image. One of skill in the art will recognize that bitmap 160A may be implemented in other ways, such as a table, a database, or other in-memory data structure. In addition, while bitmap 160A enhances performance of updating the persistent checkpoint image, local committed checkpoint image 150A may be copied in its entirety to persistent data storage without use of such a performance-enhancing feature and without departing from the scope of the invention.

To summarize the commit operation, when application instance 130A commits an update, checkpoint service 132A updates primary checkpoint image 140A and local committed checkpoint image 150A. Checkpoint service 132A then copies changes from local committed checkpoint image 150A to update the local committed checkpoint image 150B on secondary server 110B. Each updated portion of local committed checkpoint image 150A is marked in bitmap 160A to show that the respective portions have changed since the most recent update of persistent checkpoint image 170. Periodically, bitmap 160A is used to identify portions of the local committed checkpoint image 150A that have changed since the last update of persistent checkpoint image 170, and the changed portions of persistent checkpoint image 170 are updated.

Figure 2:
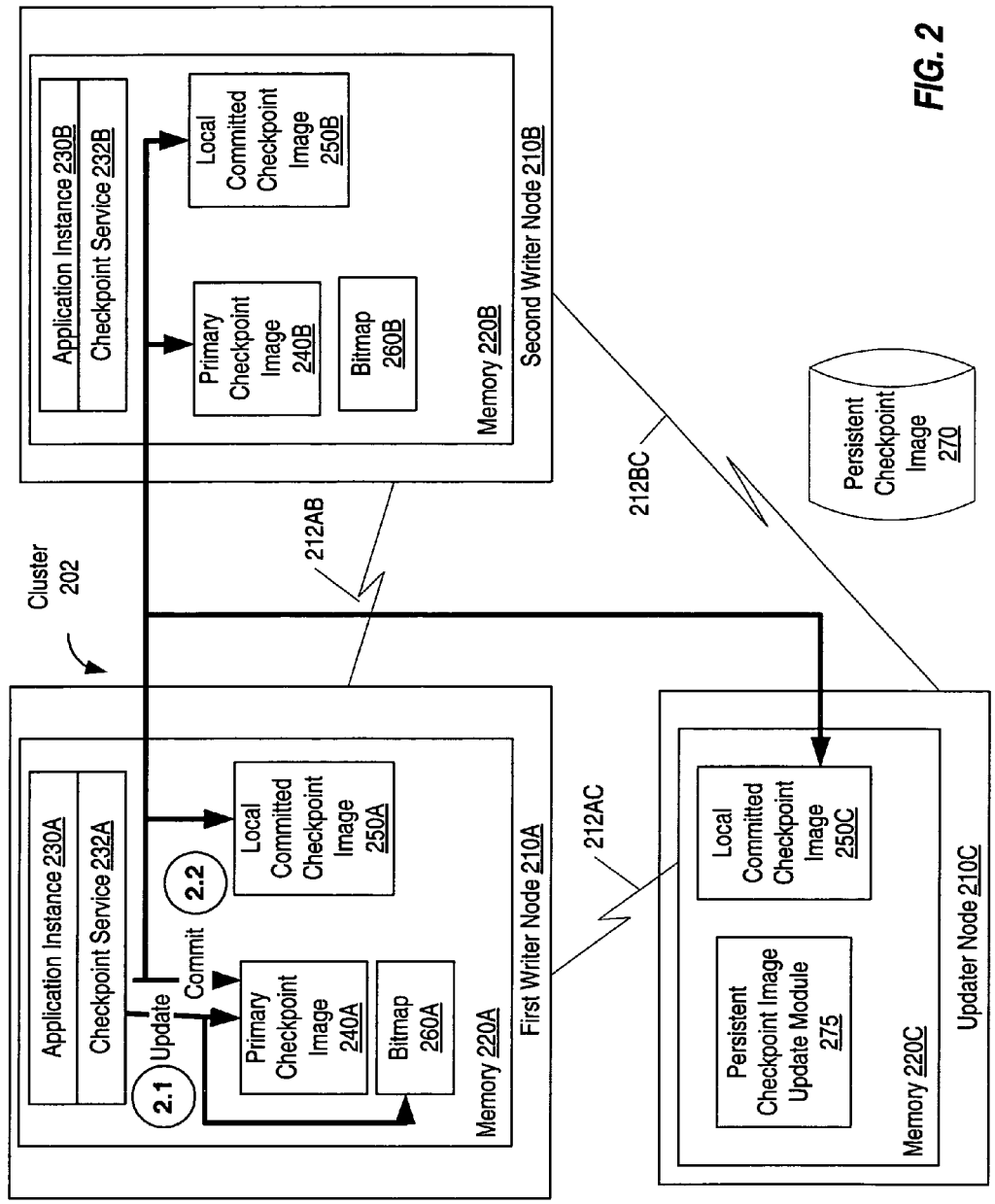
FIG. 2 is a diagram showing an update transaction and a commit transaction in an environment having two application instances that can update the state of an application (executing on nodes referred to as writer nodes) and an updater node to maintain a persistent checkpoint image in accordance with one embodiment of the invention.

FIG. 2 is a diagram showing an update transaction and a commit transaction in an environment having two application instances that can update the state of an application (executing on nodes referred to as writer nodes) and an updater node to maintain the persistent checkpoint image. As described earlier, a writer node includes an application instance that can update the state of the application, and an updater node maintains a persistent checkpoint image. In FIG. 2, a writer node is illustrated by first writer node 210A and second writer node 210B, and an updater node is illustrated by updater node 210C.

Servers in cluster 202 are connected via a cluster communication channel having portions 212AB, 212BC, and 212AC. Nodes in cluster 202 may be connected to client computer systems (not shown) via other network communication link(s) (not shown). First writer node 210A performs operations similar to those described with reference to production server 110A of FIG. 1. First writer node 210A executes application instance 230A, which uses checkpoint service 232A in a manner similar to that described with reference to checkpoint service 132A of FIG. 1. Memory 220A of first writer node 210A includes primary checkpoint image 240A, local committed checkpoint image 250A, and bitmap 260A.

Second writer node 210B also performs operations similar to those described with reference to production server 110A of FIG. 1. Second writer node 210B also is a writer node, and therefore has an application instance 230B, which uses checkpoint service 232B. In addition, memory 220B includes a primary checkpoint image 240B, a local committed checkpoint image 250B, and a bitmap 260B to track changes to data and/or the state of the application made by application instance 230B. Because both first writer node 210A and second writer node 210B can update data and the state of the application, write operations of application instances 230A and 230B are synchronized to avoid overlapping write operations to the same portion of the primary checkpoint image. Such synchronization can be performed by distributed synchronization operations such as locking, as are known in the art.

Figure 3A:
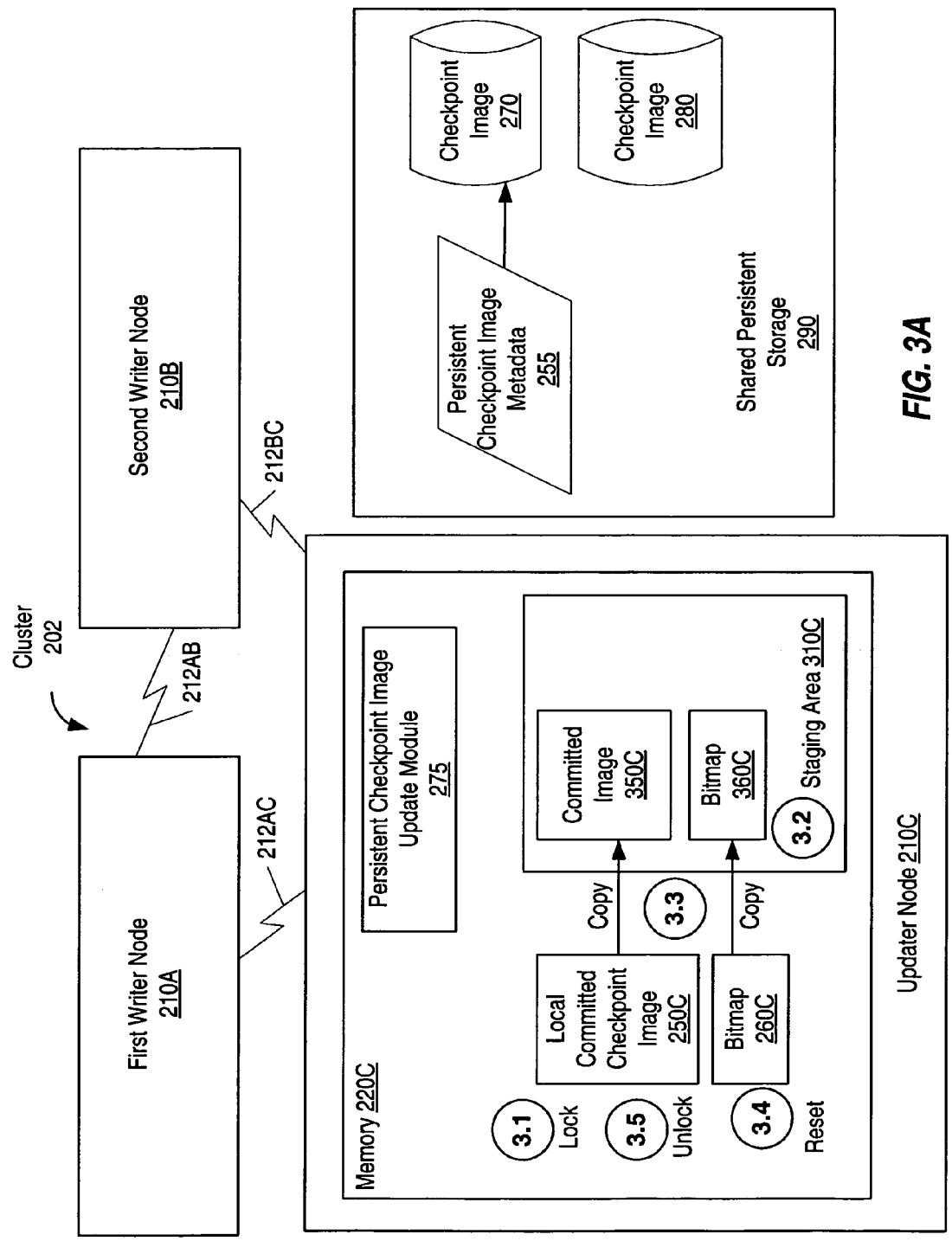
FIG. 3A shows examples of actions that may be taken by one embodiment of the persistent checkpoint image update module when updating a persistent checkpoint image.

In FIG. 3A, updater node 210C captures a persistent checkpoint image 270. Memory 220C of updater node 210C contains a local committed checkpoint image 250C, bitmap 260C, and persistent checkpoint image update module 275. Because updater node 210C does not execute an application instance, no primary checkpoint image appears in memory 220C. The operation of updater node 210C and persistent checkpoint image update module 275 is described further with reference to FIGS. 3A, 3B, and 4 below.

Referring again to FIG. 2, when application instance 230A updates data and/or a variables affecting the state of the application, data are written to the in-memory primary checkpoint image 240A, as shown by action 2.1. When application instance 230A commits an update, as shown in action 2.2, instances of the primary checkpoint image 240A on first writer node 210A and primary checkpoint image 240B in memory 220B of second writer node 210B are updated. Note that portions of primary checkpoint image 240B are updated to reflect changes to primary checkpoint image 240A, even though application instance 230B is not committing an update. To enable nodes 210A and 210B to share and independently update the primary checkpoint image, the updating application instance, here application instance 230A, obtains a lock on at least a portion of primary checkpoint image 240A.

The lock prevents application instance 230B on second writer node 210B from simultaneously updating the locked portion of primary checkpoint image 240B. However, application instance 230B may simultaneously update other portions of primary checkpoint image 240B for which a lock can be obtained. Checkpoint service 232A on first writer node 210A may operate in conjunction with checkpoint service 232B on second writer node 210B to synchronize the write operations of writer nodes 210A and 210B.

Also in response to commit operation 2.2, all committed checkpoint images in cluster 202 are updated, including local committed checkpoint image 250A on first writer node 210A, local committed checkpoint image 250B on second writer node 210B, and local committed checkpoint image 250C on updater node 210C. In addition, bitmaps 260A, 260B, and 260C are updated to record the portions of the local committed checkpoint images that changed with the update operation. The operation of updater node 210C and persistent checkpoint image update module 275 is described further with reference to FIGS. 3A, 3B, and 4 below.

After action 2.2 of FIG. 2 is completed, all nodes 210A, 210B, and 210C have consistent local copies of the committed checkpoint image and consistent copies of at least some portions of the primary checkpoint images. (At this point, some portions of the primary checkpoint images can be inconsistent if updates were not quiesced and the primary checkpoint images continued to be updated while the committed checkpoint images were synchronized.) In addition, the bitmaps 260A, 260B, and 260C on nodes 210A, 210B, and 210C are consistent.

FIG. 3A shows examples of actions that may be taken by one embodiment of the persistent checkpoint image update module when updating a persistent checkpoint image. In one embodiment, several criteria are considered in creating the persistent checkpoint image. For example, only committed changes are written to the persistent checkpoint image. Each node's in-memory checkpoint image is updated in response to a commit operation, and therefore the nodes have consistent copies of the in-memory checkpoint image reflecting the same state of the application after each commit operation. The persistent checkpoint image update module ensures that ach commit operation is fully reflected in the persistent checkpoint image; no partial updates are written to the persistent checkpoint image. Updates are performed such that the resulting persistent checkpoint image reflects the order of commit operations as the state of the application was updated in the local committed copies of the checkpoint image.

In this example, two persistent checkpoint images 270 and 280 are stored in shared persistent storage 290 and maintained by persistent checkpoint image update module 275 in memory 220C of updater node 210C. The current persistent copy of the checkpoint image to be used for recovery purposes is checkpoint image 270, as shown by the persistent checkpoint image metadata 255 in shared persistent storage 290. One of skill in the art will recognize that a copy of persistent image metadata 255 may exist in memory 220C of updater node 210C. The current persistent copy of the checkpoint image to be used for recovery purposes is also referred to herein as a recovery checkpoint image. Checkpoint image 280, also in shared persistent storage 290, is a "shadow" copy of checkpoint image 270. One of skill in the art will recognize that persistent shared storage 290 may be implemented as a shared device or as a file and can be shared by all nodes in cluster 202. (Communication links from nodes 210A, 210B, and 210C to persistent shared storage 290 are not shown.)

In FIG. 3A, a synchronization thread (not shown) is started by persistent checkpoint image update module 275 on updater node 210C to update the persistent checkpoint images in persistent storage 290. The synchronization thread is directed by persistent checkpoint image update module 275 to perform actions 3.1 through 3.5 in FIG. 3A and actions 3.6 through 3.9 in FIG. 3B. One of skill in the art will recognize that all of these actions need not be performed by a single thread or instance of a persistent checkpoint image update module. Furthermore, other computer-executable instructions or means for performing the functionality described in actions 3.1 through 3.9 in FIGS. 3A and 3B are within the scope of the invention.

Referring to FIG. 3A, in action 3.1, the local committed checkpoint image 250C on updater node 210C is locked. First writer node 210A and second writer node 210B may continue to operate normally, updating primary checkpoint images 240A and 240B of FIG. 2 (not shown in FIG. 3A), respectively, and issuing commit operations. If a commit operation occurs while the persistent checkpoint image is being updated, updater node 210C buffers the data for the commit operation until the local committed checkpoint image 250C is unlocked.

After locking the committed copy of the checkpoint image, in action 3.2, an in-memory staging area 310C is created in memory 220C of updater node 210C. In action 3.3, local committed checkpoint image 250C is copied into staging area 310C as committed image 350C and bitmap 260C is copied to staging area 310C as bitmap 360C. In action 3.4, bitmap 260C is reset and, in action 3.5, local committed checkpoint image 250C is unlocked. Any buffered commit operations are performed after the local committed checkpoint image 250C is unlocked.

Figure 3B:
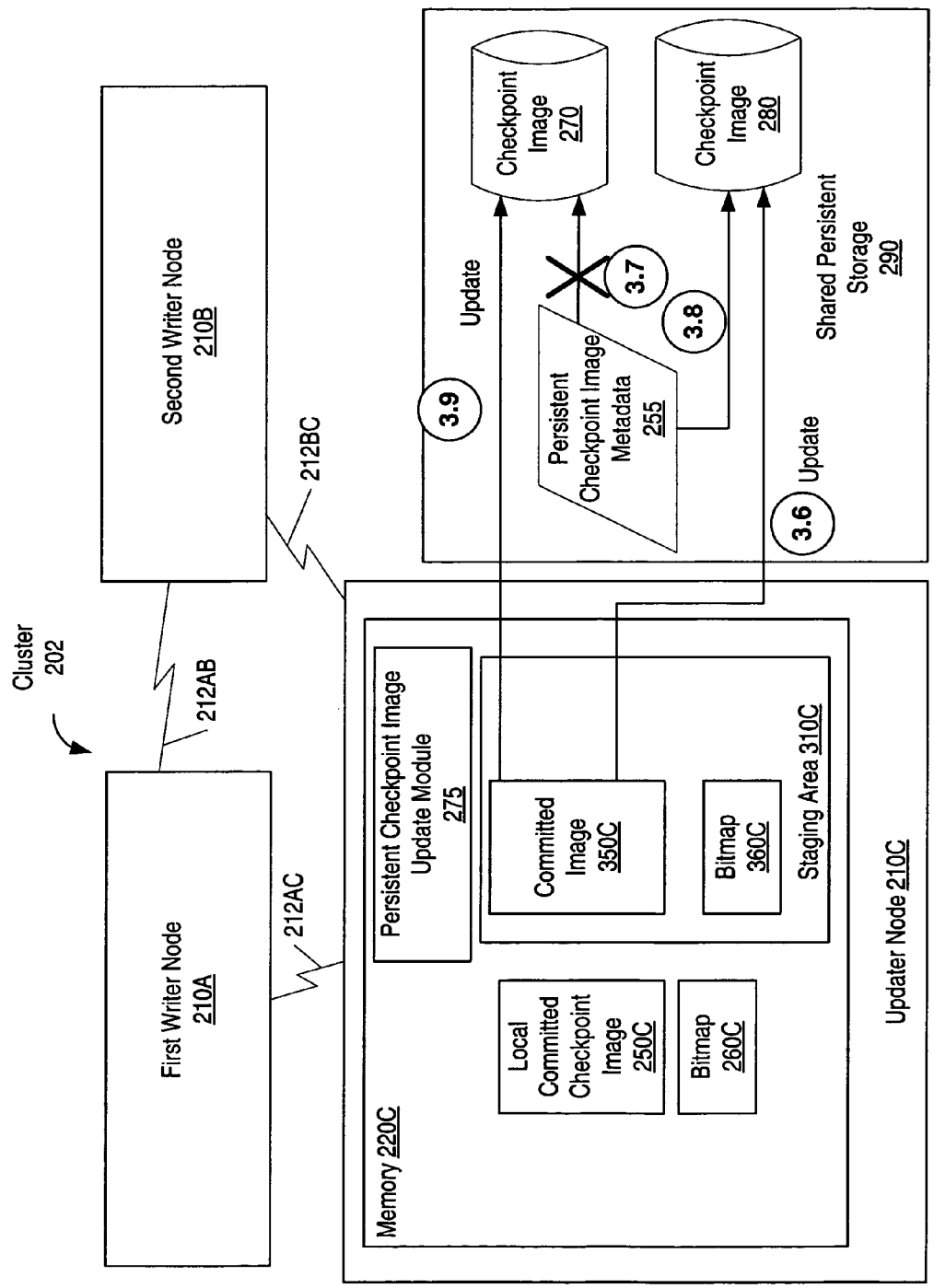
FIG. 3B shows additional actions that may be taken by the embodiment of the persistent checkpoint image update module shown in FIG. 3A when updating a persistent checkpoint image.

FIG. 3B shows additional actions that may be taken by the embodiment of the persistent checkpoint image update module shown in FIG. 3A when updating a persistent checkpoint image. In the embodiment shown, the most-recently updated persistent checkpoint image is designated as the persistent checkpoint image to be used for recovery operations. At this point, persistent checkpoint image metadata 255 points to checkpoint image 270 as the current consistent checkpoint image to be used for recovery operations. To ensure that the persistent checkpoint image is not corrupted, updates to the persistent checkpoint image are first made to the shadow copy. After creating committed image 350C and bitmap 360C in staging area 310C, as described with reference to FIG. 3A, the persistent checkpoint image update module 275 on updater node 210C continues with action 3.6, and updates the "shadow" checkpoint image (i.e., the persistent checkpoint image that is not pointed to by persistent checkpoint image metadata 255).

Once the update to the shadow checkpoint image is completed, persistent checkpoint image metadata 255 is changed in actions 3.7 and 3.8 to designate the newly-updated persistent checkpoint image 280 as the current persistent checkpoint image to be used for recovery purposes. In one embodiment, the size of persistent checkpoint image metadata 255 is less than the disk sector size; as a result, the write to persistent checkpoint image metadata 255 is atomic. Therefore, switching from one persistent copy of the checkpoint image to another is an atomic operation. The updates that were applied in action 3.6 to checkpoint image 280 are then applied to checkpoint image 270 in action 3.9 to make checkpoint images 270 and 280 consistent. As mentioned earlier, the image that is not pointed to by the persistent checkpoint image metadata 255, now checkpoint image 270, is the "shadow" copy of the persistent checkpoint image 280.

Figure 4:
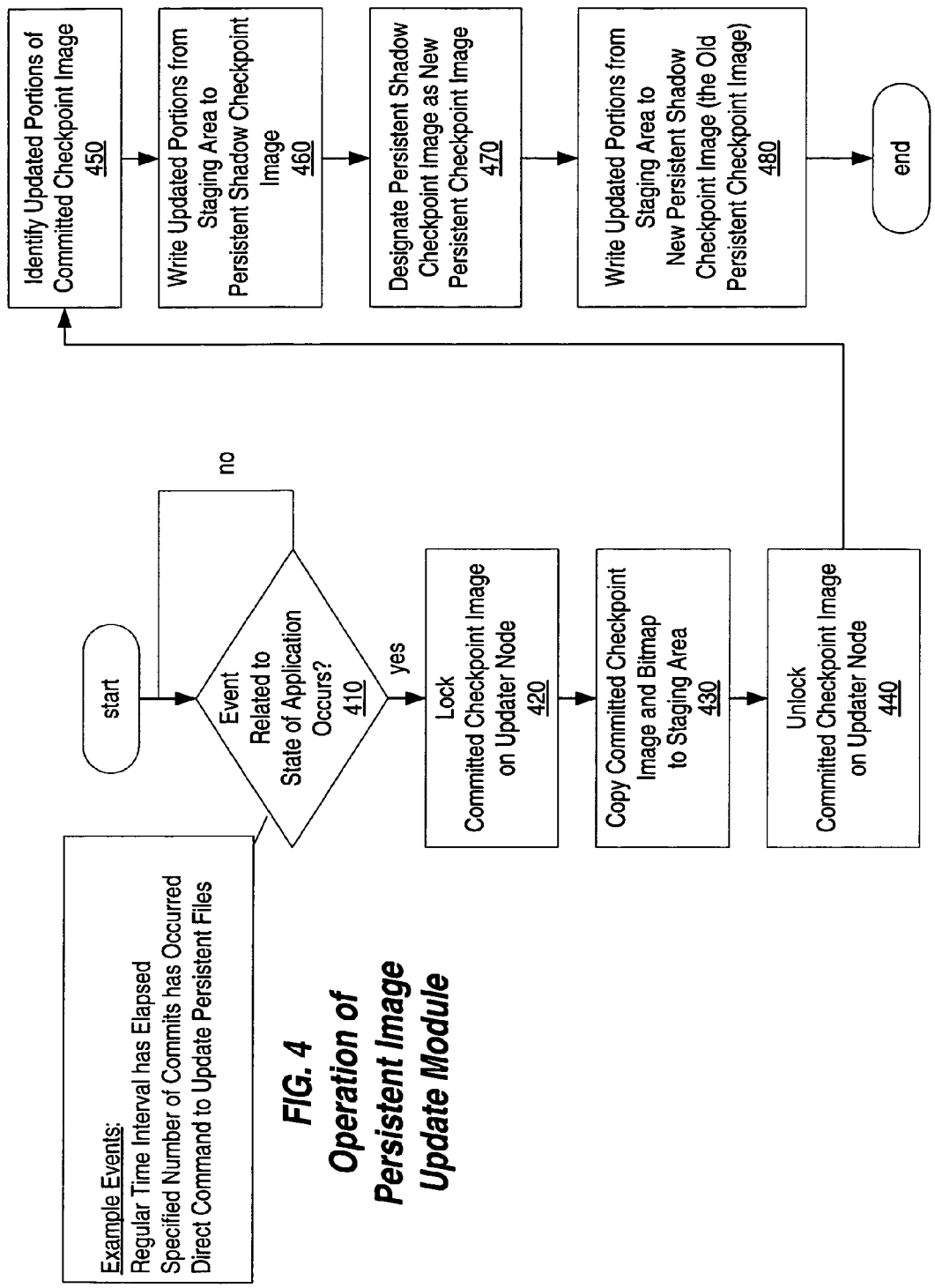
FIG. 4 is a flow diagram showing operation of a persistent image update module in maintaining a persistent checkpoint image in accordance with one embodiment of the invention.

FIG. 4 is a flow diagram showing operation of one embodiment of a persistent checkpoint image update module in accordance with one embodiment of the invention. Operation of the updater node to update the persistent checkpoint image can be triggered by one of several events. Examples of such events include lapsing of a regular time interval for updating the persistent images, performing a specified number of commit operations, or issuing a direct command to update the persistent files. The events triggering updates to the persistent checkpoint image can be established to meet service level agreement parameters, such as recovery point objectives (RPO) and/or recovery time objectives (RTO) set by an administrator. Operation of the updater node can also be triggered by other types of events that relate to the state of the application without departing from the scope of the invention.

Such events are shown in "Event Related to State of Application Occurs" decision point 410. If no such event occurs, the updater node remains in a "wait state," continuing to await an event that will trigger updating the persistent checkpoint image. This wait state is indicated by the "no" branch returning to "Event Related to State of Application Occurs" decision point 410. (Other operations on updater node 210C that are unrelated to updating the persistent copy of the checkpoint image may continue to occur even though updater node 210C is in wait mode for updating the persistent checkpoint image.) When such an event occurs at "Event Related to State of Application Occurs" decision point 410, control proceeds to "Lock Committed Checkpoint Image on Updater Node" step 420. Locking the committed checkpoint image on the updater node ensures that commit operations do not change the committed checkpoint image until a copy can be made. Control then proceeds to "Copy Committed Checkpoint Image and Bitmap to Staging Area" step 430, which was described with reference to FIG. 3A action 3.3. Once the committed checkpoint image and bitmap are in the staging area, control proceeds to "Unlock Committed Checkpoint Image on Updater Node" step 440. Because the copy of the checkpoint image is now captured in the staging area, the lock can be released and applications can continue to operate normally while the persistent copy is being updated.

After the committed checkpoint image is unlocked at "Unlock Committed Checkpoint Image on Updater Node" step 440, control proceeds to "Identify Updated Portions of Committed Checkpoint Image" step 450. Bits that are set in bitmap 360C represent portions of the committed checkpoint image that have been updated since the last update to the persistent checkpoint image. The updated portions of the local committed image are written from the staging area to the shadow checkpoint image in "Write Updated Portions from Staging Area to Persistent Shadow Checkpoint Image" step 460, as described with reference to action 3.6 of FIG. 3B. Updater node 210C ensures that the updated portions are committed to disk, for example, by opening the persistent shadow checkpoint image file with an O_SYNC option.

From "Write Updated Portions from Staging Area to Persistent Shadow Checkpoint Image" step 460, control proceeds to "Designate Persistent Shadow Checkpoint Image as New Persistent Checkpoint Image" step 470, where the former shadow image is now designated as the newly-updated consistent checkpoint image, as described with reference to actions 3.7 and 3.8 of FIG. 3B. As described above, updating the persistent checkpoint image metadata to point to the new persistent checkpoint image is preferably performed atomically. One of skill in the art will recognize that updating a metadata pointer is one way to designate the current persistent checkpoint image, and that other techniques of identifying the persistent checkpoint image are within the scope of the invention. Control then proceeds to "Write Updated Portions from Staging Area to New Persistent Shadow Checkpoint Image (the Old Persistent Checkpoint Image)" step 480, as earlier described with reference to FIG. 3B action 3.9. Updater node 210C ensures that the data for the new shadow checkpoint image are written to disk, and the synchronization process is complete.

The flowchart of FIG. 4 describes normal operation of the updater node in maintaining the persistent checkpoint image. One of skill in the art will recognize that all of these actions need not be performed by a single thread or instance of a persistent checkpoint image update module. Furthermore, other computer-executable instructions or means for performing the functionality described in the flowchart in FIG. 4 are within the scope of the invention.

The persistent checkpoint image can be used for recovery in the event of application, node, cluster, or communication link failure. In addition, the persistent checkpoint image can be used to initialize the in-memory checkpoint image of the state of the application when a new node joins the distributed computing environment or cluster. These other uses of the persistent checkpoint image are described below.

If the updater node fails, a new updater node can be chosen from the nodes remaining in the cluster. Before beginning operation, the new updater node performs a recovery operation. During recovery, the local committed copy of the checkpoint image on the new updater node is locked and copied to a staging area, similar to the process described above with reference to FIG. 3A. The entire local committed copy of the checkpoint image in the staging area is then written to the shadow checkpoint image. The pointer to the new persistent checkpoint image is changed to point to the newly-updated persistent checkpoint image, as described above with reference to FIG. 3B. This designation of the current persistent checkpoint image is performed atomically. In addition, the new shadow checkpoint image is updated so that the persistent checkpoint images are consistent.

As an alternative recovery strategy, rather than copying the entire local committed copy of the checkpoint image to the shadow checkpoint image, nodes other than the updater node maintain a log of updates. For example, the logs include a record of transaction identifiers and blocks modified in each respective transaction. When a writer node commits an update to the primary checkpoint image, the writer node provides a transaction identifier along with the buffer of data to be committed. After each update to the persistent checkpoint image, the updater node atomically broadcasts the latest transaction identifier that was written to disk. Nodes receiving the broadcast update their respective logs by deleting data for transactions occurring prior to and including that transaction identifier. If the updater node fails, the new updater node reconstructs a dirty bitmap using its copy of the log. The new updater node writes data from the committed checkpoint image only for those transaction identifiers that have not already been written to the persistent checkpoint image.

If all nodes managing checkpoint images fail, the first node to resume operation can recover the persistent checkpoint image from disk. The persistent checkpoint image serves as a persistent checkpoint image from which the node begins operation. The node copies the persistent checkpoint image onto the shadow persistent checkpoint image on disk and loads the persistent checkpoint image into the in-memory copies (the primary checkpoint image and local the committed checkpoint image, as shown in FIG. 1). The bitmap tracking changes between the committed version and the persistent version is reset, and operations resume.

One embodiment of the invention uses logs in place of the in-memory local committed copies of the checkpoint image (i.e., instead of local committed checkpoint images 250A, 250B, and 250C of FIG. 2). Instead, each node keeps a log of the committed data. A synchronization thread reads the logs, writes out updated portions of the committed data to the persistent checkpoint image, and notifies the nodes so that processed data in the logs can be deleted.

Another embodiment of the invention logs updates to the persistent checkpoint image as incremental updates on disk rather than updating the shadow image. The on-disk log maintains information about the updates that have been committed. After logging the updates, write operations are made directly to the persistent checkpoint image. During recovery, the log of updates is read and applied before the persistent checkpoint image is loaded into memory.

Another embodiment uses memory mapping in place of one or both of the in-memory checkpoint images (e.g., the primary checkpoint image 140A and local committed checkpoint image 150A of FIG. 1). In this implementation, memory is allocated to hold updates to the checkpoint image, rather than memory being allocated to hold the entire checkpoint image.

An alternative embodiment also saves memory in storing in-memory checkpoint images. Since the updater node regularly synchronizes the in-memory committed checkpoint image with the persistent checkpoint image, only one in-memory checkpoint image is maintained. A writer node keeps copies of the dirty blocks in a tree-like structure. Once these dirty blocks are copied to the persistent checkpoint image (using a shadow copy approach as described with reference to FIG. 3B), the corresponding dirty block tree entries are removed. Only writer nodes maintain dirty block tree structures.

In yet another embodiment, the persistent checkpoint image is used as the source of the state of the application for initializing a node. For example, when a new node joins the cluster, a copy of the persistent checkpoint image is provided to the new node. Initializing the new node can be performed by copying one of the local in-memory committed checkpoint images to the new node. However, if the checkpoint image is large, this process can be slow and consume excessive communication bandwidth.

An alternative to copying the in-memory checkpoint image to the new node keeps a persistent image of only the committed changes to the checkpoint image. When a new node joins the cluster, the new node obtains a read lock and reads the persistent checkpoint image to obtain a baseline version of the checkpoint image. The new node contacts the updater node to obtain changes that have not yet been written to the persistent checkpoint image. While the new node is creating the in-memory checkpoint image, the new node buffers all incoming commit requests received from an application instance. Once the in-memory checkpoint image is constructed, the new node applies the buffered commit requests to its local committed checkpoint image. By combining the baseline checkpoint image with the changes made by commit operations after the most recent update of the persistent checkpoint image, the new node constructs a current version of the checkpoint image that is consistent with the in-memory checkpoint images of other nodes in the environment.

The present invention provides many advantages. Saving persistent checkpoint images greatly speeds recovery from failure of the entire cluster. Applications can be restarted in a consistent state that was recorded prior to failure, enabling seamless recovery and resumption of operations with minimal loss of data and downtime. Persistent checkpoint images can be maintained with little or no effect on performance of applications.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The embodiments described herein are shown as operating in a clustered environment. However, the scope of the invention is not limited to a clustered environment, and other types of distributed computing environments may also use the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method implemented in a system comprising an updater node and a shared persistent storage, wherein the updater node comprises a local committed checkpoint image, wherein the persistent storage comprises persistent first and second copies of a checkpoint image, first metadata designating the persistent first copy of the checkpoint image as a shadow checkpoint image, and second metadata designating the persistent second copy of the checkpoint image as a recovery checkpoint image, the method comprising:
   updating the local committed checkpoint image;
   locking the local committed checkpoint image after it is updated;
   creating a copy of the locked local committed checkpoint image;
   unlocking the local committed checkpoint image after the creating the copy;
   updating the persistent first copy of the checkpoint image using the copy, wherein the checkpoint image comprises a prior state of an application,
   updating the first metadata to designate the updated, first persistent copy of the checkpoint image as the recovery checkpoint image;
   updating the persistent second copy of the checkpoint image using the copy after the updating the first metadata;
   updating the second metadata to designate the updated, persistent second copy of the checkpoint image as the shadow checkpoint image;
   wherein the updated, persistent first and second copies of the checkpoint image are identical to each other.

2. The method of claim 1 wherein the persistent first copy of the checkpoint image is updated in response to an event.

3. The method of claim 2 wherein
the event comprises one of
completion of a number of transactions,
a command to update a persistent copy of the checkpoint image, or
expiration of a timer.

4. The method of claim 1 further comprising:
designating a second node as a first updater node, wherein the first updater node updates the persistent first copy of the checkpoint image.

5. The method of claim 4 further comprising:
in response to failure of the first updater node, designating another node to update the persistent first copy of the checkpoint image.

6. The method of claim 4 further comprising:
designating another node as a second updater node; and
allowing the first updater node and the second updater node to update the persistent first copy of the checkpoint image simultaneously.

7. The method of claim 6 wherein
the allowing the first and second updater nodes to update the persistent first copy of the checkpoint image simultaneously comprises
locking a first respective portion of the persistent first copy to be updated by the first updater node and
locking a second respective portion of the first persistent copy to be updated by the second updater node, wherein the first and second respective portions of the persistent first copy do not overlap.

8. The method of claim 1 further comprising:
initializing an instance of the application on a third node, wherein the initializing comprises making a copy of the updated persistent first copy of the checkpoint image in a memory of the third node.

9. The method of claim 8 wherein the initializing is performed in response to a failure of a cluster.

10. A computer readable memory comprising executable instructions, wherein a method is implemented in a system in response to executing the instructions, the system comprising an updater node and a shared persistent storage, wherein the updater node comprises a local committed checkpoint image, wherein the persistent storage comprises persistent first and second copies of a checkpoint image, first metadata designating the persistent first copy of the checkpoint image as a shadow checkpoint image, and second metadata designating the persistent second copy of the checkpoint image as a recovery checkpoint image, the method comprising:
   updating the local committed checkpoint image;
   locking the local committed checkpoint image after it is updated;
   creating a copy of the locked local committed checkpoint image;
   unlocking the local committed checkpoint image after the creating the copy;
   updating the persistent first copy of the checkpoint image using the copy, wherein the checkpoint image comprises a prior state of an application,
   updating the first metadata to designate the updated, first persistent copy of the checkpoint image as the recovery checkpoint image;
   updating the persistent second copy of the checkpoint image using the copy after the updating the first metadata;
   updating the second metadata to designate the updated, persistent second copy of the checkpoint image as the shadow checkpoint image;
   wherein the updated, persistent first and second copies of the checkpoint image are identical to each other.

11. The computer readable memory of claim 10 wherein the persistent first copy of the checkpoint image is updated in response to an event.

12. The computer readable memory of claim 11 wherein
the event comprises one of
completion of a number of transactions,
a command to update a persistent copy of the checkpoint image, or
expiration of a timer.

13. The computer readable memory of claim 10 wherein the method further comprises:
designating a second node as a first updater node, wherein the first updater node updates the persistent first copy of the checkpoint image.

14. The computer readable memory of claim 13 wherein the method further comprises:
    in response to failure of the first updater node, designating another node to update the persistent first copy of the checkpoint image.

15. The computer readable memory of claim 13 wherein the method further comprises:
    designating another node as a second updater node; and
    allowing the first updater node and the second updater node to update the persistent first copy of the checkpoint image simultaneously.

16. The computer readable memory of claim 15 wherein the allowing the first and second updater nodes to update the persistent first copy of the checkpoint image simultaneously comprises
    locking a first respective portion of the persistent first copy to be updated by the first updater node and
    locking a second respective portion of the first persistent copy to be updated by the second updater node, wherein the first and second respective portions of the persistent first copy do not overlap.

* * * * *